Dec. 9, 1924.
A. B. BEITMAN
1,518,956
COMBINED REAR VIEW MIRROR AND GLARE SCREEN
Filed Dec. 31, 1920
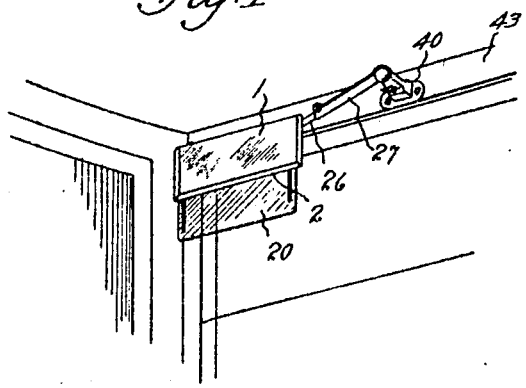
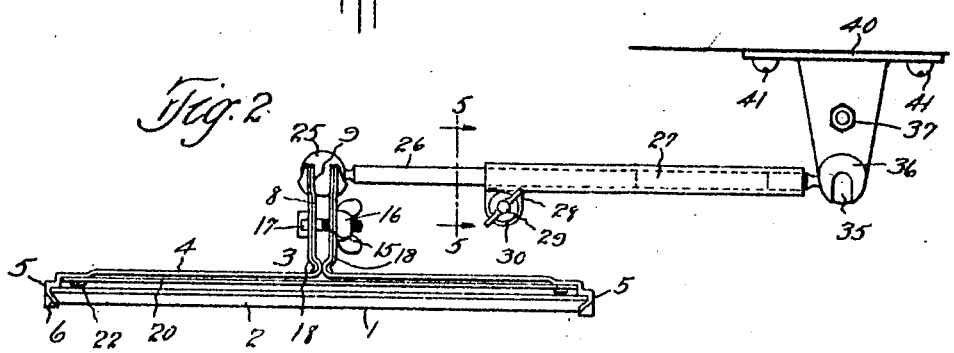
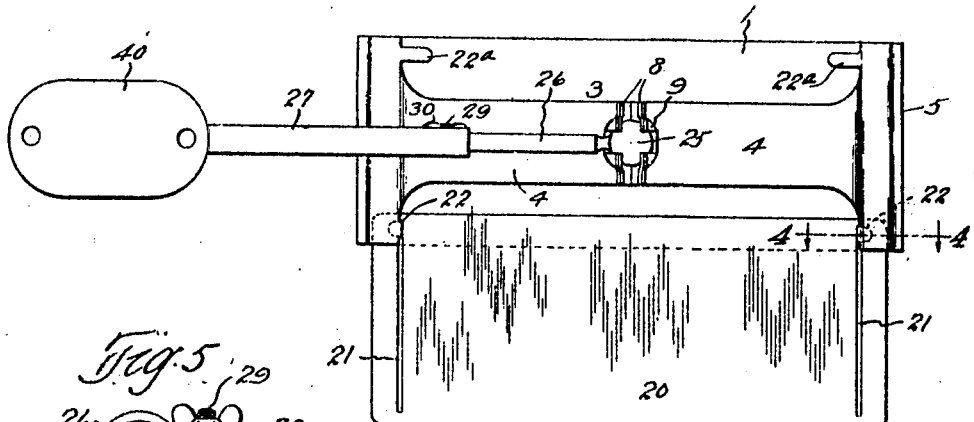
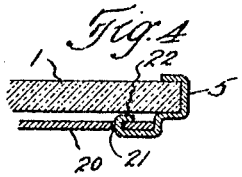
Inventor
By Albert B. Beitman
Hull, Smith, Brock & West
Attys.

Patented Dec. 9, 1924.

1,518,956

UNITED STATES PATENT OFFICE.

ALBERT B. BEITMAN, OF CLEVELAND, OHIO.

COMBINED REAR-VIEW MIRROR AND GLARE SCREEN.

Application filed December 31, 1920. Serial No. 434,298.

*To all whom it may concern:*

Be it known that I, ALBERT B. BEITMAN, a citizen of the United States, residing at Cleveland, in the county of Cuyahoga and State of Ohio, have invented a certain new and useful Improvement in Combined Rear-View Mirrors and Glare Screens, of which the following is a full, clear, and exact description, reference being had to the accompanying drawings.

This invention relates to improvements in rear view mirrors for use with automobiles and other vehicles, and to a combination with a mirror of this sort, of a glare screen for protecting the driver's eyes from the sun or from the headlights of approaching vehicles.

The objects of the invention are the provision of a combined rear view mirror and glare screen which is very convenient of manipulation and is adjustable to meet all conditions likely to be encountered in the fulfillment of its two-fold purpose; the provision of a device of this sort that is comparatively simple of construction and inexpensive of manufacture; that is neat and attractive of appearance; is durable and strong; and wherein the glare screen is concealed when not in use, the same automatically assuming its operative position when the mirror is inverted.

The foregoing objects and others which will become apparent as this description proceeds, are attained in the construction illustrated in the drawing accompanying and forming a part hereof, wherein similar reference characters designate corresponding parts throughout the several views.

In the drawing, Fig. 1 is a perspective view of the device applied to a vehicle; Fig. 2 is a plan view of the device; Fig. 3 a rear view thereof; while Figs. 4 and 5 are sectional details on the line 4—4 of Fig. 3, and the line 5—5 of Fig. 2, respectively.

The mirror 1 has its upper and lower edges beveled, as indicated at 2, and it is supported within a holder 3 comprising identical plates 4, 4 which have their outer ends bent to embrace the ends of the mirror, as indicated at 5, the upper and lower corners of the bent-over portions 5 being pinched over the beveled edges 2 of the mirror, as shown at 6, to securely hold the mirror against dislodgment. The body portions of the plates 4 are set back a material distance from the adjacent surface of the mirror, and the inner ends of the plates are turned outwardly to provide opposed jaws 8 of a clamp which terminates at its outer end in a socket 9. At the inner ends of the jaws 8, the plates 4 preferably actually engage each other so as to constitute a stop for preventing the plates from being bent inwardly at their inner ends when the jaws 8 are drawn together by means of a screw 15 which passes through the jaws and has applied to its threaded end a thumb nut 16. The head of the screw, which may be square or of other polygonal shape, is held so as to prevent the screw from turning by a lug 17 that engages the head, the lug 17 being struck out from the adjacent one of a pair of reinforcing check plates 18 that are applied to the outer sides of the jaws 8.

A glare screen 20, which may consist of a sheet of tinted celluloid or other transparent material, occupies the space between the mirror 1 and holder 3, and its ends are slotted at 21 for the accommodation of lugs 22 which extend from the widened end portions of the plates 4, the lugs being projected through the slots and then turned over and under so as to positively hold the glare screen from becoming disengaged therefrom. For manufacturing purposes, the plates 4 are made identical as hereinbefore stated. Accordingly, each plate is provided with lugs 22 and 22ª, the lugs being alike until the ones selected to support the screen are bent through the slots 21 thereof. By having two lugs on each plate, one plate may be inverted with respect to the other in the assembling of the device, and the lower lugs (as the parts are viewed in the drawing) are then engaged through the slots of the glare screen.

A ball 25 which is clamped within the socket 9 of the holder 3 constitutes a terminal of a rod 26 which telescopes within a split tube 27 that has lugs 28 at one end through which a clamping screw 29 is engaged, the screw being equipped with a thumb nut 30. The tube 27 is also equipped with a ball 35 which is embraced by a socket 36 of a clamp 37 identical with the clamp incorporated in the holder 3, the same being attached to a plate 40 that is adapted to be connected by screws 41 to the frame 43 of the vehicle. In Fig. 1, the vehicle illustrated is a closed automobile. When it is desired to use the device on a touring car or a roadster that is equipped with the ordinary type of windshield, a suitable clamp is substituted for the plate 40 for engagement with the windshield frame.

It is obvious from the foregoing disclosure how the mirror may be adjusted to afford the driver a view of the road to the rear of the machine. When used purely as a rear view mirror the mirror is turned over so that the glare screen 20 will drop to the rear of the mirror and be concealed thereby. When it is desired to use the glare screen, the mirror is inverted and the screen drops to the position shown in Figs. 1 and 3. To place the glare screen in the most advantageous position, it may be necessary to lengthen the extension rod comprising the parts 26 and 27 over that employed when the device serves only as a mirror.

Having thus described my invention, what I claim is:—

1. In combination with a rear view mirror, a glare screen that is shiftable with respect to the mirror from operative position to a position wherein it is concealed by the mirror.

2. In combination, a rear view mirror, a holder for the mirror, and a glare screen movably supported by the holder and shiftable from a position rearwardly of the mirror to a position alongside the mirror.

3. In combination, a rear view mirror, a holder for the mirror, and a glare screen movably supported by the holder and shiftable from a position rearwardly of the mirror to a position alongside the mirror, the screen and holder having parts cooperating to stop the screen in said positions.

4. In combination, a rear view mirror, a holder for the mirror, and a glare screen slidably supported by the holder and shiftable from a position rearwardly of the mirror to a position alongside the mirror, the screen and holder having one slots and the other projections extending through the slots.

5. In combination, a mirror, a holder for the mirror consisting of opposed plates having their outer ends engaged about the ends of the mirror and their inner ends turned at right angles to their body portions away from the mirror, the right angle portions of said plates constituting opposed jaws of a clamp which terminates at its outer end in a socket, means for drawing said jaws together, and an adjustable bracket having a spherical head embraced by the aforesaid socket, the body portions of the plates being spaced from the adjacent surface of the mirror, and a glare screen slidably supported within said space.

6. In combination, a mirror, opposed plates extending along the rear side of the mirror and having their outer ends engaged about the ends of the mirror and their inner ends engaged with each other and then turned outwardly at substatially right angles with respect to the body portions of the plates and spaced apart to constitute opposed jaws of a clamp, means for drawing said jaws toward each other, a supporting bracket having a part embraced by the clamp, the body portions of the plates being spaced from the adjacent surface of the mirror, and a glare screen slidable within the space between the holder and mirror, the glare screen having slots and the aforesaid plates having lugs that are projected through said slots.

In testimony whereof, I hereunto affix my signature.

ALBERT B. BEITMAN.